April 21, 1959　　　F. C. WALLACE　　　2,882,948
LOCK NUT HAVING CONTRACTIBLE CORE ACTUABLE
IN TWO LOCKING POSITIONS
Filed May 16, 1955
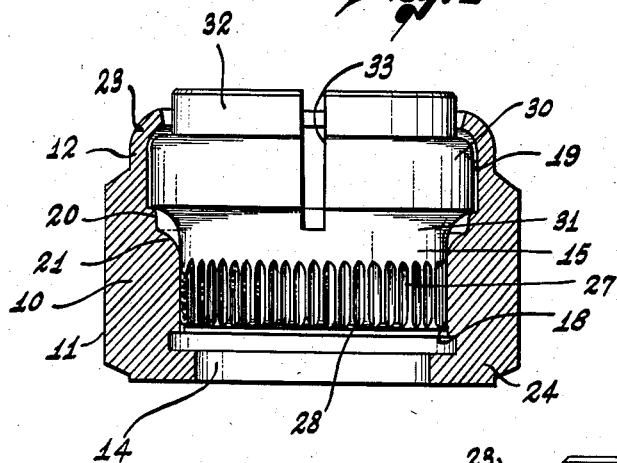
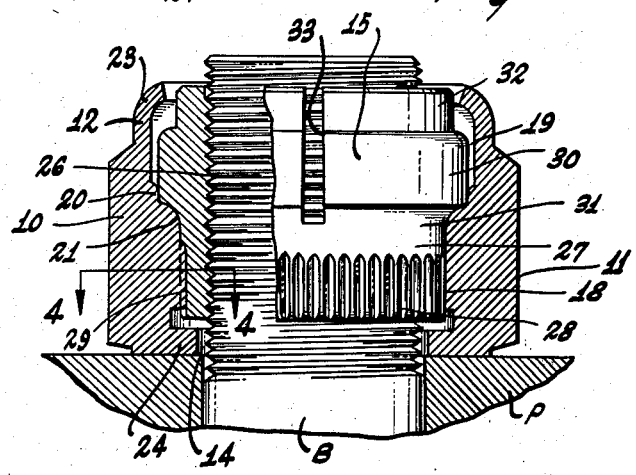
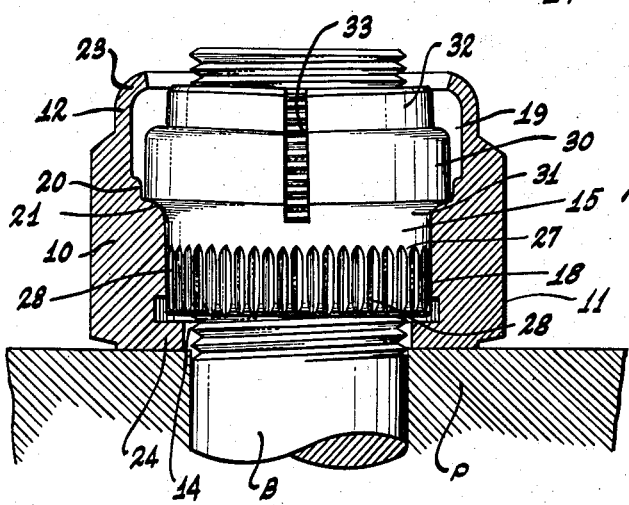
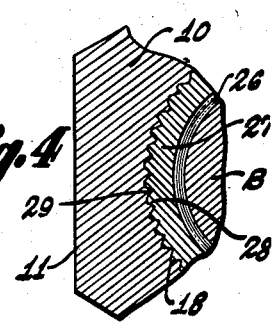
INVENTOR.
FRANK C. WALLACE
BY Gulwider Mattingly & Huntley
Attorneys

United States Patent Office 2,882,948
Patented Apr. 21, 1959

2,882,948

LOCK NUT HAVING CONTRACTIBLE CORE ACTUABLE IN TWO LOCKING POSITIONS

Frank C. Wallace, North Hollywood, Calif., assignor to H. H. Helbush and E. R. Livingston, both of Los Angeles, Calif.

Application May 16, 1955, Serial No. 508,534

4 Claims. (Cl. 151—19)

This invention relates generally to lock nuts and more particularly to an improved form of all metal lock nut.

Prior types of lock nuts utilizing a deformable plastic or fiber washer are not suitable for high temperature installation. Various proposals have therefore been made for the provision of all metal nut which is capable of withstanding heat, and at the same time has the desired locking characteristics. However, the known metal lock nuts are subject to major disadvantages which it is an object of this invention to overcome.

In many high temperature installations such as aircraft engines it is necessary to frequently remove the lock nuts for repair and inspection of parts and subsequently reassemble them. Many of the prior metal lock nuts cannot be reused because of permanent deformation which occurs, and in addition to the loss of the nut, the threads of the mating bolt or stud may also be galled or scored so that its replacement becomes necessary.

Another problem which occurs with prior types of metal lock nuts arises from the manner in which they provide residual torque or drag. It is, of course, desirable that a lock nut have frictional resistance to rotation or drag even though it be separated from the surface of the part against which it is initially tightened. This prevents complete separation of the nut from the bolt and provides an additional safety factor. In the art, this has been termed prevailing torque to indicate that some proportion of the normal torque load under which the nut is designed to be tightened will be effective to prevent rotation of the nut even if the nut is separated from the tightening surface. If the prevailing torque is established only after the nut has been tightened it is referred to as residual torque.

On the other hand, it can be appreciated that during installation and intentional removal of the lock nut from the bolt the presence of rotational drag is a handicap to the workman and greatly slows down the job being done. Prior lock nuts of the prevailing or constant drag type therefore provide the desired residual drag or torque at the expense of the installation and removal time of the nut.

An additional desirable feature in a lock nut is the presence of visual inspection means for ascertaining the tightened or loosened condition of the nut. Many engines and other assemblies are subject to final inspection by a designated inspection other than the workman who has done the manual work. It is of considerable help to the inspector if the condition of the nut can be ascertained visually, as well as being an important safety factor. Prior lock nuts have not provided such a feature and actual tests of the condition of the nut with a wrench have been required.

With the foregoing in mind it is a major object of the invention to provide a lock nut which is uniformly and regularly threaded to prevent deformation of the bolt threads and is held in firm working contact therewith by the application of axial and radial tension in such a manner than the nut is not permanently deformed and may be reused repeatedly.

It is also an object of the invention to provide a lock nut having a suspended collet which is tensioned axially upon securing of the nut and has a portion constricted inwardly for peripheral gripping of the bolt threads to increase the resistance to rotation.

An equally important object of the invention is to provide a lock nut wherein rotational drag can be applied and released to permit free spinning installation and removal of the nut, and yet has positive residual drag to hold the nut against rotation upon accidental separation of the nut from the part surface which it is intended to abut.

Another object of the invention is to provide a lock nut of the character described which includes an inspection follower that moves in such a manner as to visually indicate the internal engaging condition of the nut with the bolt threads.

A further object of the invention is to provide a lock nut which can be economically manufactured and which is of rugged and desirable construction.

These and other objects and advantages of the invention will become apparent from the following detailed description of a preferred form thereof, and from an inspection of the accompanying drawings in which:

Figure 1 is a longitudinal medial section taken through the nut in its initial or untightened condition;

Figure 2 is a view similar to Figure 1 showing the nut installed on a bolt and tightened to the extent of applying rotational drag;

Figure 3 is a longitudinal section showing the nut in its fully tightened condition; and Figure 4 is a partial cross section taken along the line 4—4 of Figure 2.

Referring now to the drawings and particularly to Figure 1 thereof, the nut is seen to be formed with an outer body or shell 10 having an external surface 11 which is of polygonal wrench-engaging shape. At the top of body 10 is a circular boss 12 of reduced wall thickness which is formed integrally thereon. Body 10 has a longitudinal axial opening 14 extending therethrough from top to bottom, and this opening is divided into different portions as will later be described in detail. A threaded collet 15 is fitted within opening 14 and suspended within body 10 for engagement with a conventional bolt. As can be appreciated, both body 10 and collet 15 may be formed of suitable metal for withstanding high temperatures so as to be suitable for use in jet engines, or other installations where extreme conditions of heat are encountered.

Along its length, body opening 14 has a lower straight walled main chamber 18 and an upper enlarged chamber 19. Between chambers 18 and 19 is an annular restricting band 20 which lies adjacent to upper chamber 19, and to a tapered or radiused supporting shoulder 21 that extends downwardly into chamber 18. Band 20 is of a diameter intermediate that of the smaller main chamber 18 and the upper enlarged chamber 19. An upper rim portion 23 of body boss 12 may be rolled inwardly to partially close the top of chamber 19, and an internally projecting stop shoulder 24 is desirably provided at the bottom end of main chamber 18.

Collet 15 is of generally tubular shape, and as is best seen in Figure 2, is formed with a regularly threaded internal wall surface 26 which is adapted to engage with the external threads of a conventional bolt B. A lower portion 27 of collet 15 is of a size to fit slidably within main chamber 18 and is held nonrotatably within body 10 as by complemental mating splines 28 and 29 formed on the wall of the collet and the wall of the chamber, respectively. The arrangement of splines 28 and 29 permits free relative longitudinal movement of collet 15 within body 10 while at all times holding it against rotation.

Above lower portion 27, collet 15 has an enlarged cylindrical head portion 30 which is joined to the lower portion by a radiused or tapered shoulder 31. Head 30 is of such a size as to overlie supporting shoulder 21 and is adapted to seat downwardly with shoulder 31 riding on the supporting shoulder. Compared to upper chamber 19, head 30 is of a diameter to fit freely therein, and its axial length is such that it may be fully contained within the upper chamber. Upward movement of head 30 is limited by engagement with rim 23 so that the collet and body can never become separated after assembly. In manufacture, rim 23 is rolled into place after collet 15 has been fitted within body 10.

Formed on the top of collet 15 above head 30 is a reduced boss or follower 32 which is of a size to pass freely through rim 23 and functions as a visual inspection means for ascertaining the internal locking condition of the nut as will be described in more detail. To complete the collet 15 and to provide for resilient radial constriction thereof, the wall of head 30 and follower 32 is formed with a plurality of longitudinally extending slots 33 which divides the collet wall into split segments. Slots 33 do not extend downwardly beyond shoulder 31, and the wall of lower collet portion 27 is solid.

The relationship between the size of collet head 30 and the restricting band 20 formed in body 10 is of critical importance in the functioning of the device, and the head is formed so as to be of slightly larger diameter than that of the band. That is, head 30 is of such a size that it must be squeezed radially inwardly in order to enter within band 20. As this occurs, the upper portion of collet threads 26 are constricted against the threads of bolt B to exert frictional resistance or rotational drag tending to resist rotation of the nut upon the bolt. This provides the residual torque or drag feature of the nut, and any predetermined amount of drag can be exerted by carefully controlling the diametrical relationship between head 30 and band 20.

In its initial or free position, collet 15 has the position relative to body 10 as shown in Figure 1. Head 30 is within enlarged chamber 19 and threaded collet wall 26 fits freely and easily upon the threads of bolt B. In this condition the nut is free spinning onto the bolt so that it may be brought up to the surface of the part or work which the bolt and nut are to secure without the use of a wrench. It should be noted that head 30 will not enter into restricting band 20 freely because of the dimensional relationship previously described and remains within chamber 19 until wrench torque is applied. The inspection follower 32 projects upwardly beyond rim 23 and since it is readily visible it can be seen at a glance that the nut is not secured in position.

Figure 2 shows the condition of the nut after it has been threadedly advanced on bolt B and partially tightened against the surface of a typical part P. Once body 10 has engaged part P, further rotation of the nut causes downward movement of collet 15 relative to the body. As this occurs, head 30 moves downwardly into restricting band 20 and the wall of the head is constricted inwardly against the threads of the bolt. This causes the exertion of rotational drag which prevents free rotation of the nut even though it should become separated from the surface of part P. Follower 32 has been withdrawn within the top of rim 23 and it is apparent upon inspection that the nut has been tightened sufficiently so that the residual drag or torque feature of the nut is effective.

After head 30 has been pulled downwardly to the bottom of band 20, shoulder 31 engages against supporting shoulder 21 and further rotation of the nut causes the upper portion of the collet to be further constricted radially inwardly for even firmer engagement with the threads of bolt B. As shoulders 21 and 31 engage they tend to limit any further downward movement of collet 15. However, as further rotation of body 10 occurs, the bolt B exerts downward tension on collet 15 tending to pull shoulder 31 downwardly relative to shoulder 21 and causes collet head 30 to bend upwardly from its original position. It should be noted that there are two components of force acting on head 30, one causing it to pivot or constrict radially inwardly and the other acting to bend it upwardly. This permits a slight axial displacement of collet 15 downwardly and the natural resilience of the material tends to urge it to return to its original shape with a spring action. Collet 15 may therefore be considered as spring loaded upwardly and thus the working edges of the entire length of collet threads 26 are urged firmly against the opposed edges of the bolt threads. Normally for the smaller sizes of nuts, the downward movement of collet 15 is stopped short of stop shoulder 24 so that the spring loading of the collet remains fully effective. In some larger sizes of nuts subject to high torque loads, collet 15 may be allowed to bottom on shoulder 24. It is to be understood, that both the radial constriction of the collet and its axial deflection downwardly are designed within the elastic limits of the metal used. Thus, upon release of the nut from the surface of part P, collet head 30 will spring upwardly and the segments of the collet wall will spring outwardly.

While in the position shown in Figure 3, the nut is securely locked in position and if any axial play or movement of bolt B occurs the threads of the collet will remain firmly engaged with those of the bolt so long as the axial deflection of the collet is not exceeded. This, of course, keeps the nut securely locked to the bolt under all normal conditions. If the bolt B should slip or move axially a greater amount so as to completely separate body 10 from the surface of part P the release of the axial tension may occur. However, the nut is still held against rotation on the bolt by the residual drag or torque exerted through restricting band 20. In other words, collet head 30 cannot spring fully outwardly so long as it is within band 20 and the predetermined amount of residual drag remains in effect.

It should be noted that head 30 cannot be released from band 20 until the bottom of body 10 has moved away from the surface of part P a distance greater than the longitudinal depth of the band. Since this distance greatly exceeds any possible axial movement of bolt B or part P which might occur in the assembly due to temperature changes or vibration, the residual drag of the nut will remain in effect at all times.

When it is desired to intentionally remove the nut from its secured position it is backed away a few turns with a wrench until body 10 is separated from part P a distance greater than the depth of band 20. Even then, the residual drag upon the bolt will not automatically release, but it can be released quite easily by a slight blow on body 10 to drive it downwardly relative to collet 15. Head 30 unseats from band 20 and moves upwardly into chamber 19 so that the wall of the collet is free to spring outwardly to its original unconstricted shape. Thereafter, the nut may be spun freely off of the bolt or stud by hand, and this greatly facilitates its removal and reinstallation.

While I have thus described in considerable detail a preferred embodiment of the invention, it is to be understood that modifications of design and construction can be made without departing from the scope of the invention. Therefore I do not wish to be restricted to the foregoing except as defined in the appended claims.

I claim:

1. A lock nut comprising: a body having a longitudinal opening extending therethrough and divided along the length thereof into a lower main chamber, a restricting band of intermediate size having an axially directed surface, and an upper enlarged chamber, said main chamber and restricting band being connected by an upwardly and outwardly tapered supporting shoulder; and a collet fitted slidably within said body and having internal threads therethrough for receiving a bolt, said collet having a lower portion shorter than said main chamber and fitted therein and an upper enlarged head portion adapted to seat downwardly against said shoulder and having a slot extending along the wall thereof, said head portion fitting freely within said enlarged chamber and being larger in diameter than said restricting band whereby to be squeezed and held inwardly by said band when moved therein to exert a predetermined rotational drag upon said bolt, the bottom of said head portion and the top of said band being shaped for cooperating inwardly camming action, and said head portion being placed under axial tension and further squeezed inwardly by the resilient deflection of said head downwardly beyond said shoulder; and engaging means on said collet and said body for holding said collet non-rotatably within said body.

2. A lock nut comprising: a body having a longitudinal opening extending therethrough and divided along the length thereof into a lower main chamber, a restricting band of intermediate size having an axially directed surface, and an upper enarged chamber, said main chamber and restricting band being connected by an upwardly and outwardly tapered supporting shoulder; and a collet fitted slidably within said body and having internal threads therethrough for receiving a bolt, said collet having a lower portion shorter than said main chamber and fitted therein and an upper enlarged head portion adapted to seat downwardly against said shoulder and having slots extended along the wall thereof and dividing said wall into split segments, said head portion fitting freely within said enlarged chamber and being larger in diameter than said restricting band whereby to be squeezed and held inwardly by said band when moved therein to exert a predetermined rotational drag upon said bolt, said head portion and the top of said band being shaped for cooperating inwardly camming action, and said head portion being placed under axial tension and further squeezed inwardly by the resilient deflection of said head downwardly beyond said shoulder; and engaging means on said collet and said body for holding said collet non-rotatably in said body.

3. A lock nut comprising: a body having a longitudinal opening extending therethrough and divided along the length thereof into a lower main chamber, a cylindrical restricting band of intermediate size, and an upper enlarged chamber, said main chamber and restricting band being connected by an upwardly and outwardly tapered supporting shoulder; a collet fitted slidably within said body and having internal threads therethrough for receiving a bolt, said collet having a lower portion shorter than said main chamber and fitted therein and an upper enlarged head portion adapted to seat downwardly against said shoulder and having slots extended along the wall thereof and dividing said wall into split segments, said head portion fitting freely within said enlarged chamber and being larger in diameter than said restricting band whereby to be squeezed and held inwardly by said band when moved therein to exert a predetermined rotational drag upon said bolt, said head portion and the top of said band being shaped for cooperating inwardly camming action, and said head portion being placed under axial tension and further squeezed inwardly by the resilient deflection of said head downwardly beyond said shoulder; engaging means on said collet and said body for holding said collet non-rotatably therein; a stop shoulder formed on said body at the bottom of said main chamber for limiting downward movement of said body; a rim on the upper end of said body projecting inwardly to limit the upward movement of said collet; and an inspection follower of reduced diameter formed on the upper end of said collet and of a size to pass through said rim, said follower projecting above the top of said body when said head portion is within said enlarged chamber and being withdrawn into said body when said head portion is within said restricting band.

4. A lock nut comprising: a body having a longitudinal opening extending therethrough and divided along the length thereof into a lower main chamber and an upper enlarged chamber connected by an upwardly and outwardly tapered shoulder; a collet fitted slidably within said body and having internal threads therethrough for receiving a bolt, said collet having a lower portion of a length shorter than said main chamber and fitted therein, and an upper enlarged head portion adapted to seat downwardly against said shoulder and fitted within said enlarged chamber and having a longitudinal slot extending along the wall in the upper portion thereof; and inwardly projecting means within said body between said main chamber and upper chamber and extending radially inwardly beyond the normal periphery of said head portion to squeeze and hold said head portion inwardly for exerting a predetermined rotational drag upon said bolt, said means and the bottom of said head having cooperating surfaces for inward camming action, and said head portion being placed under axial tension and further squeezed inwardly by the resilient deflection of said head downwardly beyond said shoulder, and engaging means on said collet and said body for holding said collet non-rotatably within said body.

References Cited in the file of this patent

UNITED STATES PATENTS

| | | |
|---|---|---|
| 661,655 | Bryce | Nov. 13, 1900 |
| 896,358 | Bryce | Aug. 18, 1908 |
| 2,361,979 | Tarwater et al. | Nov. 7, 1944 |
| 2,562,376 | Cragg et al. | July 31, 1951 |
| 2,571,145 | Lord | Oct. 16, 1951 |
| 2,605,805 | Woodling | Aug. 5, 1952 |
| 2,627,293 | Le Boeuf | Feb. 3, 1953 |
| 2,677,407 | McKenzie | May 4, 1954 |

FOREIGN PATENTS

| | | |
|---|---|---|
| 6,152 | Australia | Aug. 4, 1927 |